EDWARD T. COVELL.

Machines for Closing Seams of Metallic Cans.

No. 4,778. Reissued March 5, 1872.

WITNESSES
H. H. Young
Ewell A. Dick

E. T. Covell Inventor
By David A. Burr Atty.

UNITED STATES PATENT OFFICE.

EDWARD T. COVELL, OF BROOKLYN, NEW YORK.

IMPROVEMENT IN MACHINES FOR CLOSING SEAMS OF METALLIC CANS.

Specification forming part of Letters Patent No. 94,947, dated September 21, 1869; antedated September 10, 1869; reissue No. 4,778, dated March 5, 1872.

DIVISION B.

SPECIFICATION.

I, EDWARD T. COVELL, of the city, county, and State of New York, have invented a new and Improved Machine for Closing and Pressing the Side Seams of Metallic Vessels, of which the following is a specification:

My invention relates to the use and arrangement of a supporting block or mandrel to be inserted within an open-ended body of a sheet-metal can or other vessel, in combination with clamping and compressing blocks or jaws, adapted to close upon and clamp the side seams of the vessel placed upon the mandrel, the mandrel being either left free to move in unison with one of the compressing-blocks or jaws against an opposite fixed block, or made stationary, as an anvil, to resist the compressing force of the blocks closing from opposite sides against it; the object of my said invention being to produce a machine wherein the side seams of a sheet-metal can of any form may be readily closed and clamped after being properly locked or fitted together. My said invention relates also to the support of the mandrel in such manner as that it may not only move in unison with the movable compressing-jaw, but also swing upon a pivot out from under the same; the object of this part of my invention being to facilitate the insertion of the can upon the mandrel.

Figure 1:
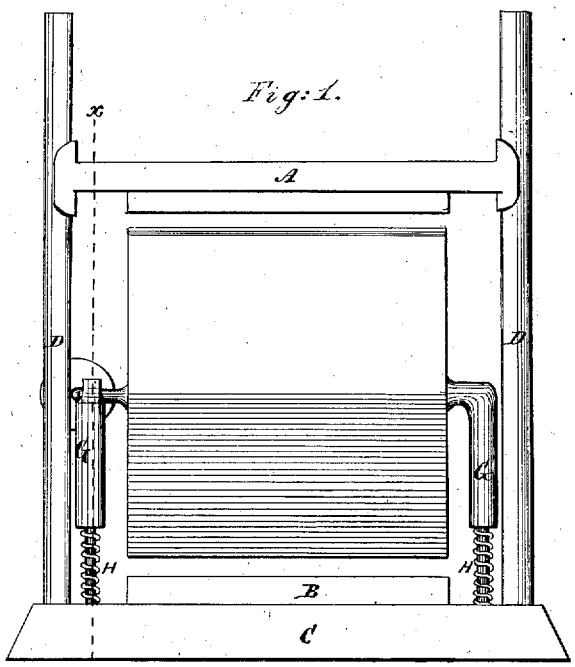
Figure 2:
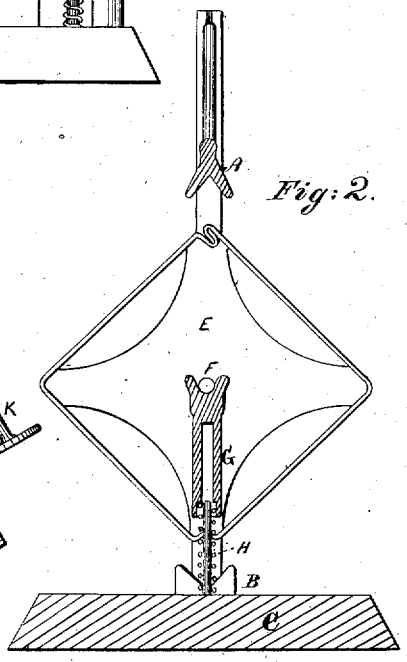

In the accompanying drawing, Figure 1 is a side view of that form of my machine in which the mandrel is made to move against a fixed compressing block or jaw, with a can placed over the mandrel. Fig. 2 is a vertical section in the line *x x* of Fig. 1, showing a can placed upon the mandrel; and Fig. 3, a top view of the apparatus, illustrating the mandrel swung out from the compressing-jaws.

A B represent the two longitudinal clamping and compressing blocks or jaws of my apparatus. In the machine illustrated in the drawing, the lower block B is fixed upon a bed-plate, C, and the upper block is made to move to and from it in parallel lines and in the same vertical plane by means of a power-press or other suitable mechanism for the purpose. The block A is guided in its vertical movements by one or more standards or ways D D, arranged at one or both ends thereof. Between the two compressing-blocks A B is placed a plate, block, or mandrel, E, Fig. 2, formed and adapted to brace and support from within two or more of the opposite sides or angles of a sheet-metal can placed thereon, and to resist the compression of the clamping-jaws when bearing thereon from opposite directions. When the compressing-jaws both move, this mandrel E may be fixed intermediate the two, or it may be left free to move in a uniform direction with the two, or with one of them to bear against the other, as in the apparatus illustrated in the drawing. In this case the mandrel is supported at either end by means of a rod or pin, F, projecting centrally from each end, and each secured to or resting upon a sleeve, G, embracing and sliding upon an upright pillar or standard, H, encircled by a spring, as illustrated in Figs. 1 and 2.

Figure 3:
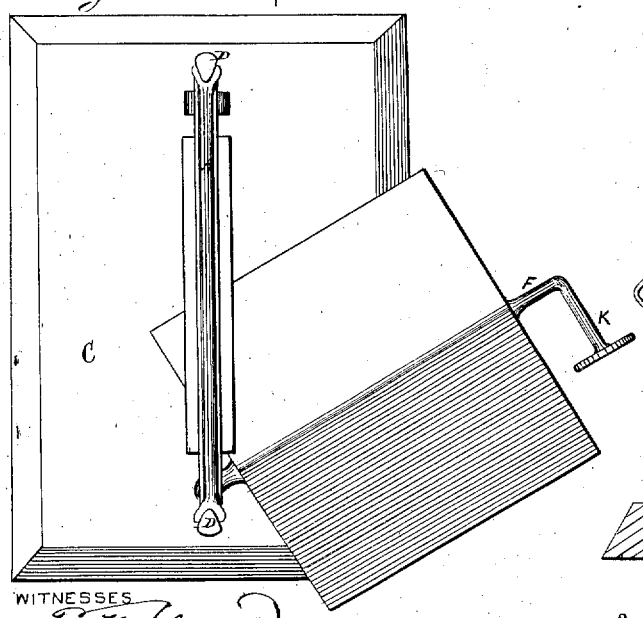

By securing the pin at one end to its supporting-sleeve, the sleeve forms a hinge to turn upon its pillar as a pivot, and by extending the opposite end, which simply rests upon its appropriate sleeve, a handle, K, is formed, as shown in Fig. 3, by means whereof the mandrel may be swung around from under the compressing-jaws and from between the guide-standards, in order to permit the open-ended vessel to be readily slipped thereon.

The compressing blocks or jaws are grooved or hollowed out on their inner opposite faces to conform closely to the angles or to the curve of the sides and seams of the can to be operated upon, and the apparatus is adapted for use with any form of can, whether cylindrical, elliptical, or flat-sided. The mandrel may be provided with a joint at its pivot-end to permit a semi-revolution thereof on its axis, and when one or more of the seams have been closed, as described, the others may be brought in place to be closed by a partial revolution of the mandrel without removing the body of the can therefrom.

The operation of closing seams with the apparatus is as follows: The side seams of the can being first partially folded and properly interlocked or fitted together, the vessel is slipped over and upon the mandrel, so that the mandrel shall bear against and support the seams from within, and also bear against the opposite seams, if there be any, or the opposite side of the vessel, to prevent it from being compressed or crushed out of shape. Where the vessel is angular and the seams formed, as is customary, upon the corners thereof, the mandrel will form a diagonal brace between the opposite angles or corners, as illustrated in Fig. 2. When the can has thus been placed upon the mandrel, the upper jaw A is moved by the power-press, and bearing upon the corner or seam of the can will force it and the mandrel down until its lower corner strikes upon and is embraced by the lower jaw B, and the pressure is continued until the seams are perfectly and tightly flattened down and closed, the mandrel serving, meanwhile, as an inner anvil or support. So soon as the upper jaw is lifted, the action of the springs will elevate the mandrel and the can thereon clear from the lower jaw, so that the can may be readily removed therefrom.

The mandrel P and the compressing-jaws may all be so secured as to admit of being detached and replaced by other forms and sizes thereof to work upon various forms and sizes of cans.

It is evident that the machine may be arranged in such a manner as that the jaws or compressing-plates shall move and close upon the seams of the can or other vessel horizontally instead of vertically; that each or both of the jaws or compressing-plates may be made movable, and that any suitable means of obtaining pressure may be employed without departing from my invention, and I contemplate all such variations in the operation and arrangement of my machine.

I claim as my invention—

1. Longitudinal compressing blocks or jaws, in combination with an interposed longitudinal supporting block or mandrel, formed and adapted, respectively, the latter to support from within, and the former to embrace and clamp from without, the side seams of a can placed upon the mandrel, for the purpose of closing and flattening down said seams, substantially as herein set forth.

2. In combination with longitudinal compressing blocks or jaws A B, operating to close the side seams or seam of a metallic vessel, substantially as herein described, a central inner supporting block or mandrel, pivoted and supported at right angles thereto, upon elastically-yielding supports, to receive and sustain the metallic vessel under the operation of said blocks, substantially as herein set forth.

As witness my hand hereto, this 22d day of January, 1872.

E. T. COVELL.

In the presence of—
GEORGE S. DOTEN,
GEO. CALLAHAN.